United States Patent
Ray et al.

(10) Patent No.: US 11,310,519 B2
(45) Date of Patent: Apr. 19, 2022

(54) DEBLOCKING OF SUBBLOCK BOUNDARIES FOR AFFINE MOTION COMPENSATED CODING

(71) Applicant: QUALCOMM Incorporated, San Diego, CA (US)

(72) Inventors: Bappaditya Ray, La Jolla, CA (US); Han Huang, San Diego, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/022,700

(22) Filed: Sep. 16, 2020

(65) Prior Publication Data
US 2021/0084324 A1   Mar. 18, 2021

Related U.S. Application Data

(60) Provisional application No. 62/901,952, filed on Sep. 18, 2019.

(51) Int. Cl.
*H04N 19/51*   (2014.01)
*H04N 19/117*   (2014.01)
*H04N 19/176*   (2014.01)

(52) U.S. Cl.
CPC .......... *H04N 19/51* (2014.11); *H04N 19/117* (2014.11); *H04N 19/176* (2014.11)

(58) Field of Classification Search
None
See application file for complete search history.

(56) References Cited

U.S. PATENT DOCUMENTS

2021/0029370 A1*   1/2021   Li .................. H04N 19/50
2021/0044833 A1*   2/2021   Yang ............... H04N 19/184

OTHER PUBLICATIONS

Bross B., et al., "Versatile Video Coding (Draft 6)", 127. MPEG and 15th JVET Meeting, Jul. 3, 2019-Jul. 12, 2019, Gothenburg, SE (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

(Continued)

*Primary Examiner* — Christopher G Findley
(74) *Attorney, Agent, or Firm* — Shumaker & Sieffert, P.A.

(57) ABSTRACT

An example device for decoding video data includes memory configured to store the video data and one or more processors implemented in circuitry and communicatively coupled to the memory. The one or more processors are configured to determine whether a coding mode for a current block of the video data is an affine mode. The one or more processors are also configured to determine whether pattern refined optical flow (PROF) is enabled in the sequence parameter set (SPS) for the current block. Based at least in part on the coding mode for the current block being the affine mode and PROF being enabled in the SPS for the current block, the one or more processors are configured to disable a deblocking filter for subblock boundaries of the current block and decode the current block with the deblocking filter disabled for the subblock boundaries of the current block.

23 Claims, 11 Drawing Sheets

(56) References Cited

OTHER PUBLICATIONS

Bross B., et al., "Versatile Video Coding (Draft 9)", JVET-R2001-vA, Joint Video Experts Team (JVET) of ITU-T SG 16 WP 3 and ISO/IEC JTC 1/SC 29/WG 11, 18th Meeting, by Teleconference, Apr. 15-24, 2020, 528 Pages.
Chen J., et al., "Algorithm Description for Versatile Video Coding and Test Model 6 (VTM 6)", 15th Meeting, Joint Video Experts Team (JVET) of ITU-T SG 16 WP 3 and ISO/IEC JTC 1/SC 29/WG 11, JVET-O2002-v2, Gothenburg, SE, Jul. 3-12, 2019, pp. 1-89.
Chen J., et al., "Algorithm Description of Joint Exploration Test Model 1", 1. JVET Meeting, Oct. 19-21, 2015, Geneva, CH (The Joint Video Exploration Team of ISO/IEC JTC1/SC29/WG11 and ITU-T SG.16 WP 3), URL: HTTP://PHENIX.INT-EVRY.FR/JVET/, No. JVET-A1001, Feb. 24, 2016 (Feb. 24, 2016), XP030150000, 27 Pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Luo J., et al., "CE2-Related: Prediction Refinement with Optical Flow for Affine Mode", Joint Video Experts Team (JVET) of ITU-T SG 16 WP 3 and ISO/IEC JTC 1/SC 29/WG 11, Document: JVET-N0236-r5,14th Meeting: Geneva, CH, Mar. 19-27, 2019, pp. 1-8.
Luo J., et al., "CE4: Prediction refinement with optical flow for affine mode (Test 2.1)", JVET-O0070, Joint Video Experts Team (JVET) of ITU-T SG 16 WP 3 and ISO/IEC JTC 1/SC 29/WG 11, JVET-O0070, 15th Meeting: Gothenburg, SE, Jul. 3-12, 2019, pp. 1-4.
Zhang K., et al., "An Improved Framework of Affine Motion Compensation in Video Coding", IEEE Transactions on Image Processing (Early Access), Oct. 22, 2018, pp. 1-13.

* cited by examiner

DEBLOCKING OF SUBBLOCK BOUNDARIES FOR AFFINE MOTION COMPENSATED CODING

This application claims priority to U.S. Provisional Application No. 62/901,952, filed Sep. 18, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for selectively disabling deblocking filter operations and/or modifying boundary strength calculations for subblock boundaries of affine coded coding blocks. Pattern refined optical flow (PROF) is a technique for overcoming some deficiencies in subblock based affine motion prediction. When a video coder applies PROF to a block of video data, the video coder may smooth subblock boundaries within the block of video data. When a video coder applies deblocking filter operations, the video coder may also smooth subblock boundaries within the block of video data. Problems may occur when a video coder applies both PROF and deblocking filter operations. By selectively disabling deblocking filter operations and/or modifying boundary strength calculations for subblock boundaries of affine coded coding blocks according to the techniques of this disclosure, over smoothing of subblock boundaries may be avoided or lessened.

In one example, a method includes determining whether a coding mode for a current block of the video data is an affine mode, determining whether pattern refined optical flow (PROF) is enabled in the sequence parameter set (SPS) for the current block, based at least in part on the coding mode for the current block being the affine mode and PROF being enabled in the SPS for the current block, disabling a deblocking filter for subblock boundaries of the current block, and decoding the current block with the deblocking filter disabled for the subblock boundaries of the current block.

In another example, a device includes memory configured to store the video data and one or more processors implemented in circuitry and communicatively coupled to the memory, the one or more processors being configured to: determine whether a coding mode for a current block of the video data is an affine mode; determine whether PROF is enabled in the SPS for the current block; based at least in part on the coding mode for the current block being the affine mode and PROF being enabled in the SPS for the current block, disable a deblocking filter for subblock boundaries of the current block; and decode the current block with the deblocking filter disabled for the subblock boundaries of the current block.

In another example, a device includes memory configured to store the video data, and one or more processors implemented in circuitry and communicatively coupled to the memory, the one or more processors being configured to: determine whether a coding mode for a current block of the video data is an affine mode; signal that PROF is enabled in the SPS for the current block; based at least in part on the coding mode for the current block being the affine mode and PROF being enabled for the current block, disable a deblocking filter for subblock boundaries of the current block; and encode the current block with the deblocking filter disabled for the subblock boundaries of the current block.

In another example, a non-transitory computer-readable storage medium storing instructions that, when executed, cause one or more processors to: determine whether a coding mode for a current block of the video data is an affine mode; determine whether PROF is enabled in the SPS for the current block; based at least in part on the coding mode for the current block being the affine mode and PROF being enabled in the SPS for the current block, disable a deblocking filter for subblock boundaries of the current block; and decode the current block with the deblocking filter disabled for the subblock boundaries of the current block.

The details of one or more examples are set forth in the accompanying drawings and the description below. Other features, objects, and advantages will be apparent from the description, drawings, and claims.

DETAILED DESCRIPTION

Pattern refined optical flow (PROF) is a technique for overcoming some deficiencies in subblock based affine motion prediction which will be discussed later in this disclosure. If a video coder applies PROF to a block of video data, the video coder applies PROF prior to applying filtering operations, such as deblocking filtering. When a video coder applies PROF to a block of video data, the video coder may smooth subblock boundaries within the block of video data. When a video coder applies deblocking filter operations, the video coder may also smooth subblock boundaries within the block of video data. Problems may occur when a video coder applies both PROF and deblocking filter operations. For example, when a video coder applies both PROF and deblocking filter operations to a block of video data, the video coder may over smooth subblock boundaries and wash out important features in video data for display.

According to the techniques of this disclosure, a video coder may disable a deblocking filter for subblock boundaries of an affine coded block. By disabling the deblocking filter for subblock boundaries of an affine coded block, a video coder may avoid over smoothing that may occur when the video coder applies both PROF and deblocking filter operations. Moreover, according to the techniques of this disclosure, the video coder may also save processing resources because deblocking filter operations otherwise use processing resources.

Figure 1:
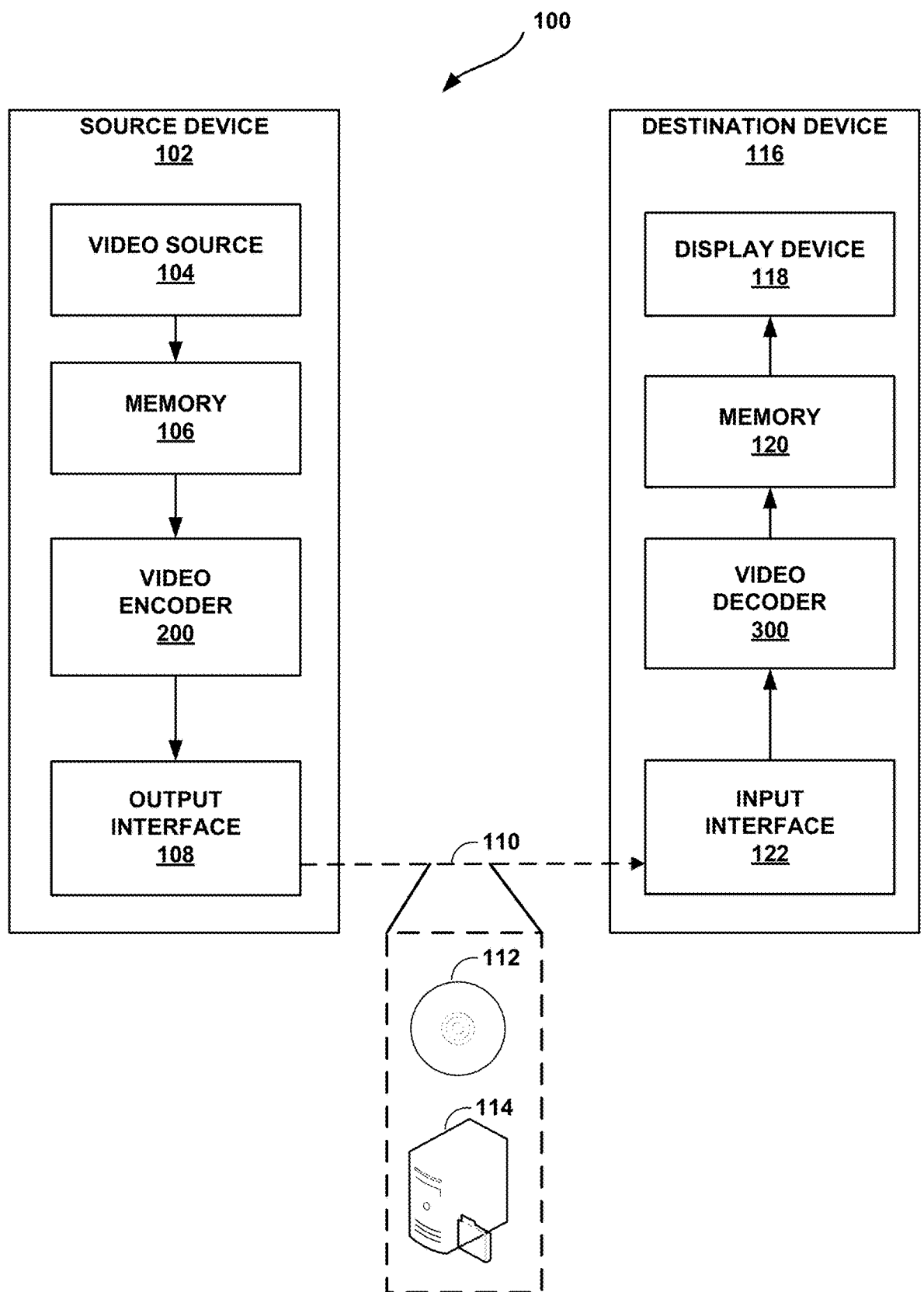
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for selectively disabling deblocking filter operation or modifying boundary strength calculations for subblock boundaries of affine coded coding blocks. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for selectively disabling deblocking filter operation or modifying boundary strength calculations for subblock boundaries of affine coded coding blocks. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, S E, 3-12 Jul. 2019, JVET-O2001-vE (hereinafter "VVC Draft 6"). The most recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-vA (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three subblocks. In some examples, a triple or ternary tree partition divides a block into three subblocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes determining whether a coding mode for a current block of the video data is an affine mode, determining whether PROF is enabled in the SPS for the current block, based at least in part on the coding mode for the current block being the affine mode and PROF being enabled in the SPS for the current block, disabling a deblocking filter for subblock boundaries of the current block, and decoding the current block with the deblocking filter disabled for the subblock boundaries of the current block.

In accordance with the techniques of this disclosure, a device includes memory configured to store the video data and one or more processors implemented in circuitry and communicatively coupled to the memory, the one or more processors being configured to: determine whether a coding mode for a current block of the video data is an affine mode; determine whether PROF is enabled in the SPS for the current block; based at least in part on the coding mode for the current block being the affine mode and PROF being enabled in the SPS for the current block, disable a deblocking filter for subblock boundaries of the current block; and decode the current block with the deblocking filter disabled for the subblock boundaries of the current block.

In accordance with the techniques of this disclosure, a device includes memory configured to store the video data, and one or more processors implemented in circuitry and communicatively coupled to the memory, the one or more processors being configured to: determine whether a coding mode for a current block of the video data is an affine mode; signal that PROF is enabled in the SPS for the current block; based at least in part on the coding mode for the current block being the affine mode and PROF being enabled for the current block, disable a deblocking filter for subblock boundaries of the current block; and encode the current block with the deblocking filter disabled for the subblock boundaries of the current block.

In accordance with the techniques of this disclosure, a non-transitory computer-readable storage medium storing instructions that, when executed, cause one or more processors to: determine whether a coding mode for a current block of the video data is an affine mode; determine whether PROF is enabled in the SPS for the current block; based at least in part on the coding mode for the current block being the affine mode and PROF being enabled in the SPS for the current block, disable a deblocking filter for subblock boundaries of the current block; and decode the current block with the deblocking filter disabled for the subblock boundaries of the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
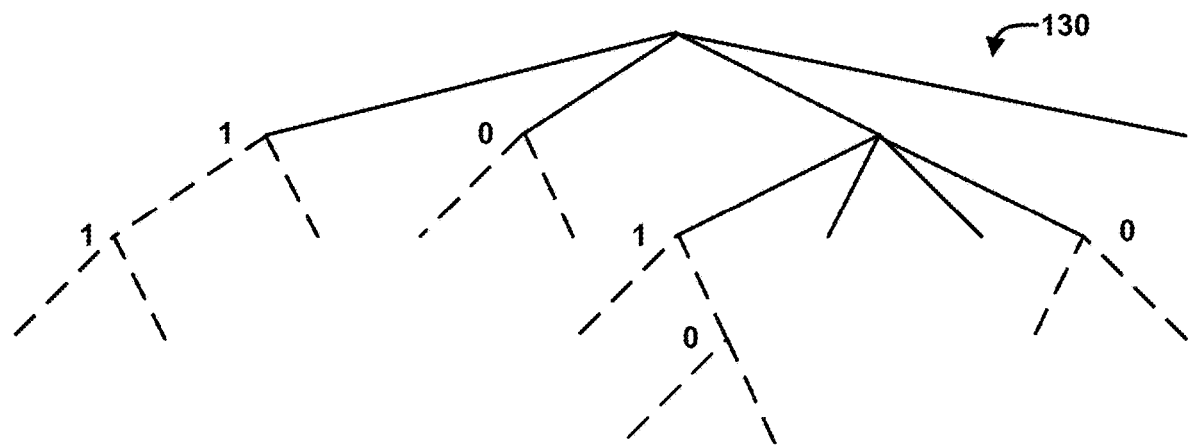
FIGS. 2A and 2B are conceptual diagrams illustrating an example quadtree binary tree (QTBT) structure, and a corresponding coding tree unit (CTU).
Figure 2B:
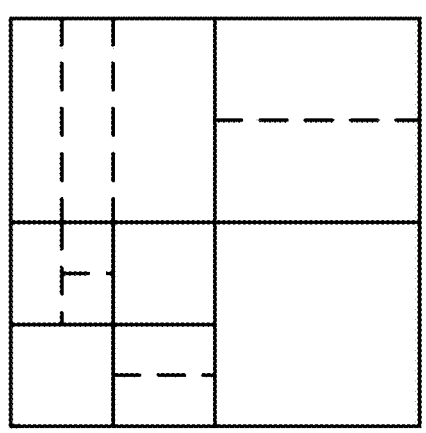

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 subblocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
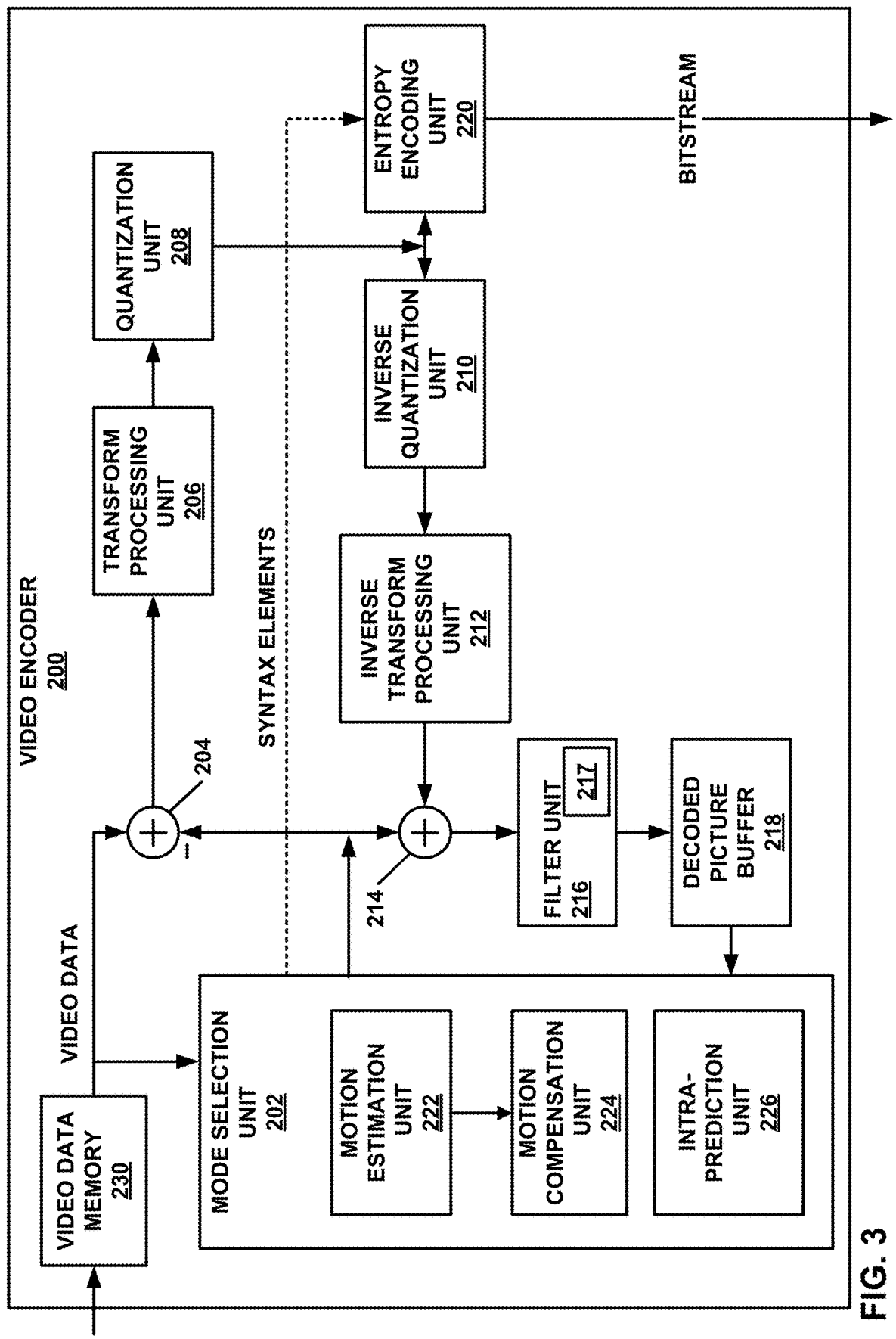
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations through deblocking filter 217 to reduce blockiness artifacts along edges of CUs. Operations of filter unit 216 may be skipped, in some examples. For example, according to the techniques of this disclosure, video encoder 200 may selectively disable deblocking filter 217 for subblock boundaries of an affine coded block. For example, video encoder 200 may determine whether a coding mode for a current block of the video data is an affine mode. Video encoder 200 may also signal that PROF is enabled in the SPS for the current block. Based at least in part on the coding mode for the current block being the affine mode and PROF being enabled for the current block, video encoder may disable deblocking filter 217 for subblock boundaries of the current block. Video encoder 200 may encode the current block with deblocking filter 217 disabled for the subblock boundaries of the current block.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including memory configured to store the video data, and one or more processors implemented in circuitry and communicatively coupled to the memory, the one or more processors being configured to: determine whether a coding mode for a current block of the video data is an affine mode; signal that PROF is enabled in the SPS for the current block; based at least in part on the coding mode for the current block being the affine mode and PROF being enabled for the current block, disable a deblocking filter for subblock boundaries of the current block; and encode the current block with the deblocking filter disabled for the subblock boundaries of the current block.

Figure 4:
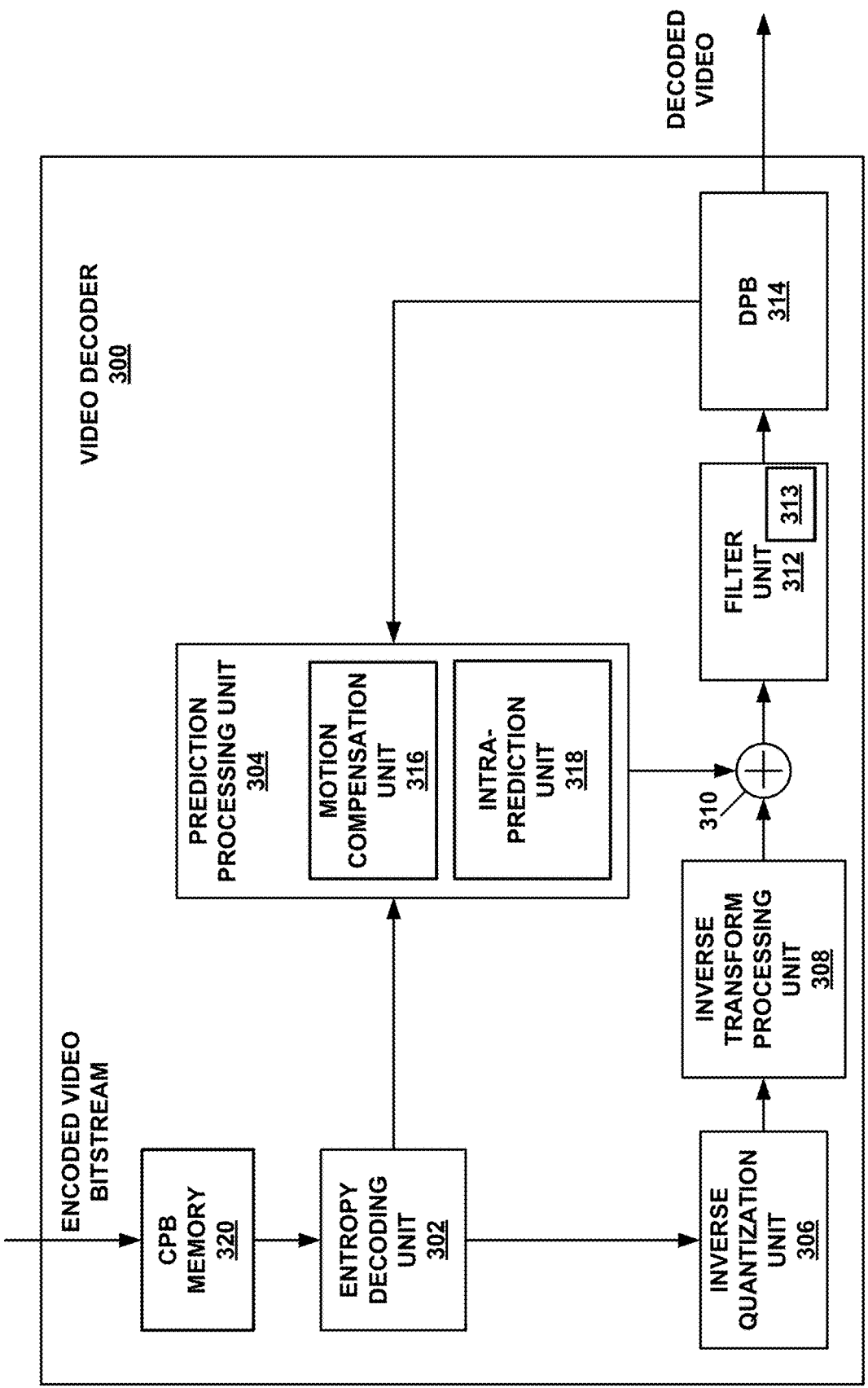
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations using deblocking filter 313 to reduce blockiness artifacts along edges of the reconstructed blocks. Operations of filter unit 312 are not necessarily performed in all examples. For example, according to the techniques of this disclosure, video decoder 300 may selectively disable deblocking filter 313 for subblock boundaries of an affine coded block. For example, video decoder 300 may determine whether a coding mode for a current block of the video data is an affine mode. Video decoder may also determine whether PROF is enabled in the SPS for the current block. Based at least in part on the coding mode for the current block being the affine mode and PROF being enabled in the SPS for the current block, video decoder 300 may disable deblocking filter 313 for subblock boundaries of the current block. Video decoder 300 may decode the current block with deblocking filter 313 disabled for the subblock boundaries of the current block.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including memory configured to store the video data and one or more processors implemented in circuitry and communicatively coupled to the memory, the one or more processors being configured to: determine whether a coding mode for a current block of the video data is an affine mode; determine whether PROF is enabled in the SPS for the current block; based at least in part on the coding mode for the current block being the affine mode and PROF being enabled in the SPS for the current block, disable a deblocking filter for subblock boundaries of the current block; and decode the current block with the deblocking filter disabled for the subblock boundaries of the current block.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual (MPEG-4 Part 2), ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC or HEVC) with its extensions. During the April 2018 meeting of the Joint Video Experts Team (WET), the Versatile Video Coding (VVC) standardization activity (also known as ITU-T H.266) was begun with the evaluation of the video compression technologies submitted in response to the Call for Proposals.

Affine motion compensation in VVC is now described. In HEVC, only a translation motion model is applied for motion compensation prediction (MCP). While in the real world, there are many kinds of motion, e.g., zoom in/out, rotation, perspective motions and the other irregular motions. In J. Chen, Y. Ye., S. H. Kim, "Algorithm description for Versatile video coding and Test Model 6 (VTM 6)", 15th JVET Meeting, Gothenburg, S E, July 2019, JVET-O2002 (hereinafter "VTM6"), a block-based affine transform motion compensation prediction is disclosed.

Figure 5:
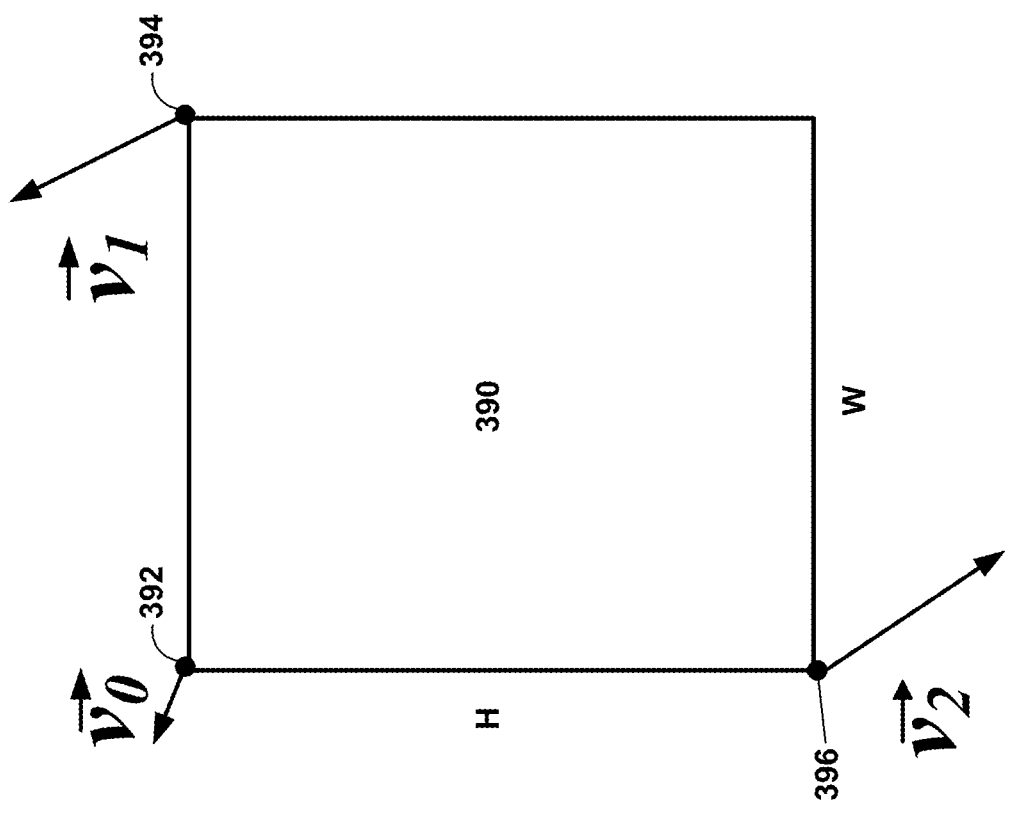
FIG. 5 is a conceptual diagram depicting an affine motion model for 4 parameters and 6 parameters.
Figure 5:
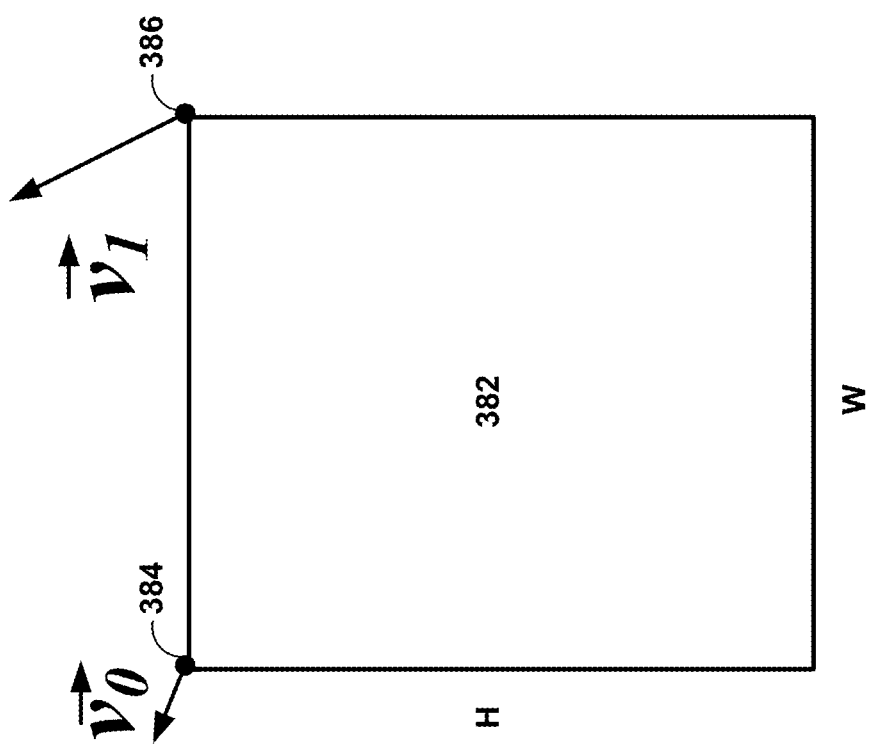

FIG. 5 is a conceptual diagram depicting an affine motion model for 4 parameters and 6 parameters. As shown in FIG. 5, the affine motion field of the block is described by motion information of two control points (4-parameter) for block 382 or three control points (6-parameter) for block 390. The two control points in the 4-parameter affine model are the top left pixel and the top right pixel, such as top left pixel 384 and top right pixel 386 for block 382. The three control points in the 6-parameter affine model are the top left pixel, the top right pixel, and the bottom left pixel, such as top left pixel 392, top right pixel 394, and bottom left pixel 396 for block 390. See, e.g., K. Zhang, Y-W. Chen, L. Zhang, W.-J. Chien, M. Karczewicz, "An improved framework of Affine Motion Compensation in Video Coding", IEEE Transactions on Image Processing, March 2019; and VTM 6.

For a 4-parameter affine motion model, a motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \quad (1)$$

For a 6-parameter affine motion model, a motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 6:
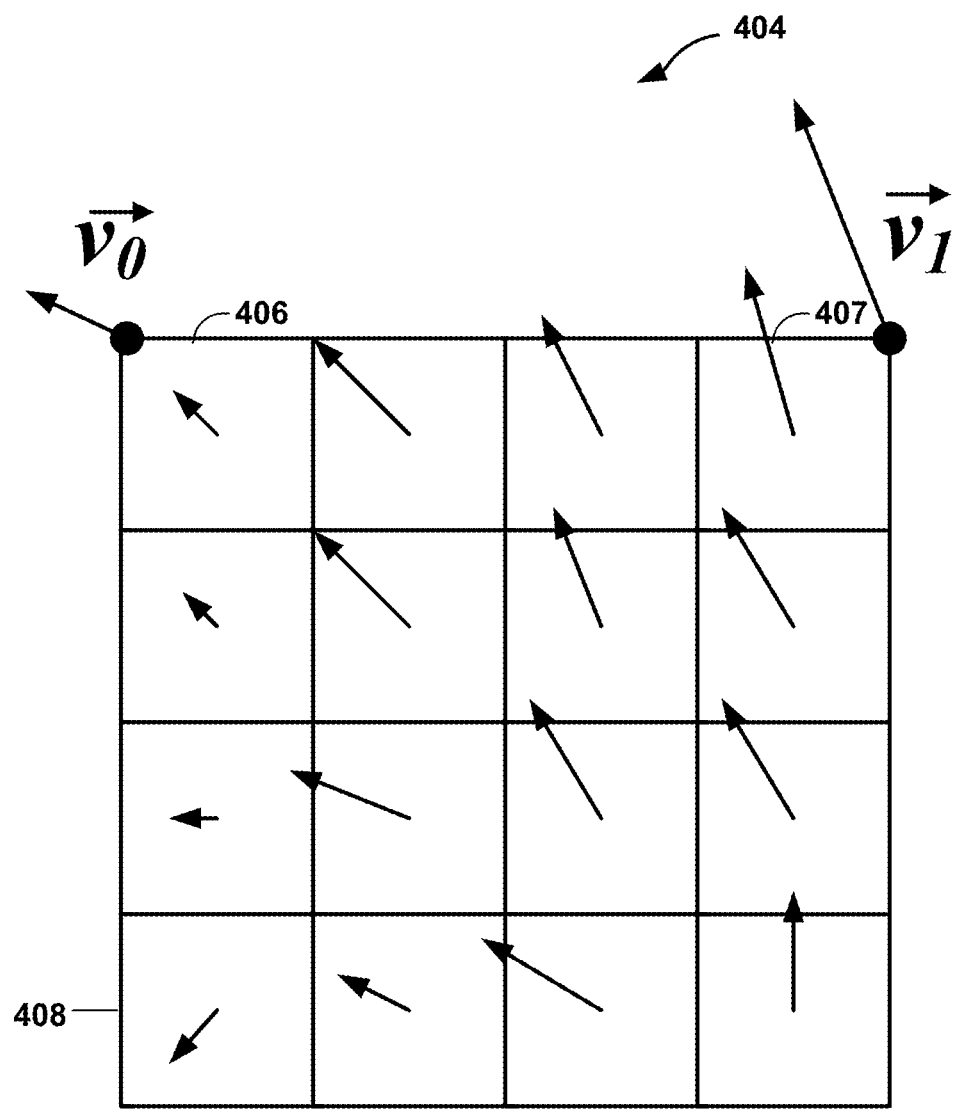
FIG. 6 is a conceptual diagram depicting affine motion vectors per 4×4 subblocks.

FIG. 6 is a conceptual diagram depicting affine motion vectors per 4×4 subblocks. In order to simplify the motion compensation prediction, block based affine transform prediction may be applied. For example, video encoder 200 (e.g., motion estimation unit 222 and/or motion compensation unit 224) and video decoder 300 (e.g., motion compensation unit 316) may perform block-based affine transform prediction for block 404. To derive a motion vector of each 4×4 luma subblock, such as subblock 406, subblock 407, or subblock 408, video encoder 200 or video decoder 300 may calculate the motion vector of the center sample of each subblock, as shown in FIG. 6, according to the above equations (1) and (2), and round the result to 1/16 fraction accuracy. Then video encoder 200 or video decoder 300 apply the motion compensation interpolation filters to generate the prediction of each subblock with a derived motion vector. The subblock size for chroma-components is also set to be 4×4. The MV of a 4×4 chroma subblock is calculated as the average of the MVs of the four corresponding 4×4 luma subblocks.

Deblocking of affine subblock boundaries in VVC is now described. The deblocking filtering process is applied on an 8×8 grid for prediction subblock boundaries. For example, filter unit 216 of video encoder 200 and filter unit 312 may deblock filter the 8×8 grids. The prediction subblock boundaries include the prediction unit boundaries introduced by subblock temporal motion vector prediction (SbTMVP) and affine modes, and only boundaries associated with the luma component are considered.

For SbTMVP and affine prediction subblocks, similar to the logic in a PU in HEVC, the deblocking filter is applied on an 8×8 grid with the consideration of the difference between motion vectors and reference pictures of the neighboring prediction subblock. See J. Chen, Y. Ye., S. H. Kim, "Algorithm description for Versatile video coding and Test Model 6 (VTM 6)", 15th JVET Meeting, Gothenburg, S E, July 2019, JVET-O2002; and B. Bross, J. Chen, S. Liu, "Versatile Video Coding (Draft 6)", 15th JVET Meeting, Gothenburg, S E, July 2019, JVET-O2001.

Figure 7:
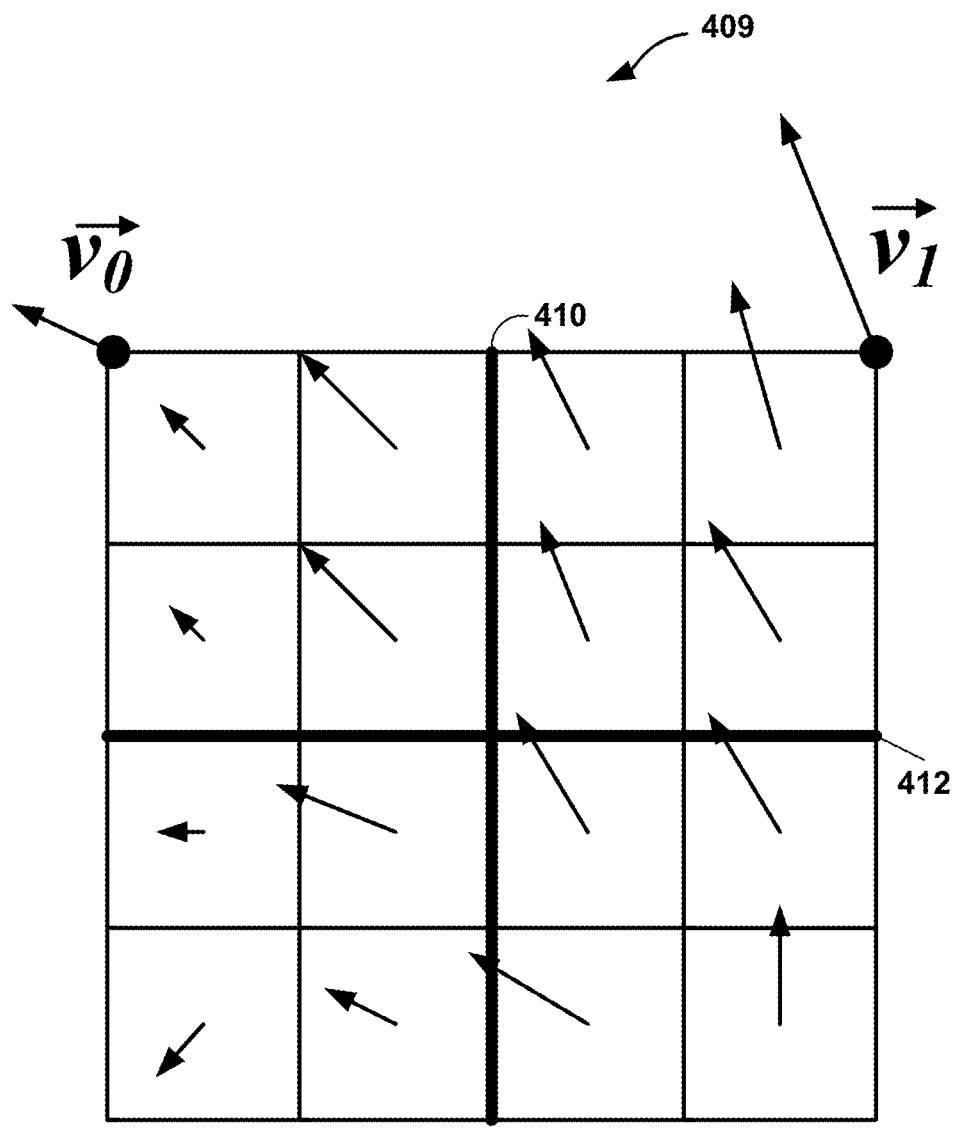
FIG. 7 is a conceptual diagram depicting affine subblock boundaries on an 8×8 grid where a deblocking filter may be applied.

FIG. 7 is a conceptual diagram depicting affine subblock boundaries on an 8×8 grid where a deblocking filter may be applied. Deblocking boundaries 410 and 412 are depicted with heavy lines in block 409.

Pattern refined optical flow (PROF) for affine motion compensation in VVC is now described. Affine motion model parameters may be used to derive the motion vector of each pixel in a CU. However, as mentioned previously, VVC Draft 6 adopted a subblock based affine motion compensation method operating on 4×4 block level. The subblock based affine motion compensation is a trade-off between coding efficiency, complexity and memory access bandwidth. Subblock based affine motion compensation loses prediction accuracy due to subblock-based prediction when compared to pixel based affine motion compensation. See J. Luo, Y. He, "CE2-related: Prediction refinement with optical flow for affine mode", JVET-N0236, Geneva, C H, March 2019; and J. Luo, Y. He, "CE4: Prediction refinement with optical flow for affine mode (Test 2.1)", 15th JVET Meeting, Gothenburg, S E, July 2019, JVET-O0070. PROF was developed as a technique to address the loss in prediction accuracy.

Figure 8:
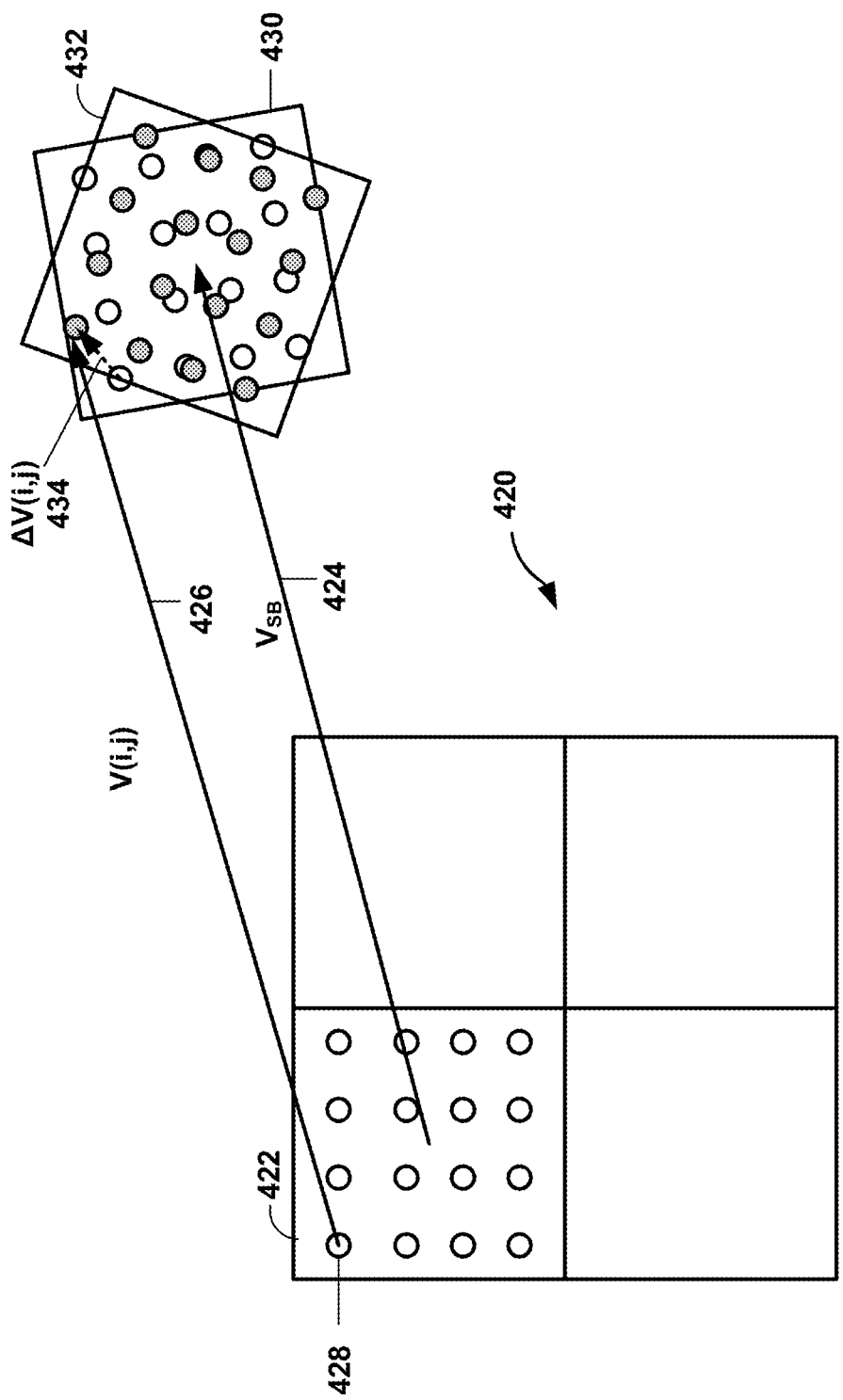
FIG. 8 is a conceptual diagram depicting subblock motion vector and a difference between a pixel motion vector for a sample location and the subblock motion vector for the subblock to which the pixel belongs.

FIG. 8 is a conceptual diagram depicting subblock motion vector and a difference between a pixel motion vector for a sample location and the subblock motion vector for the subblock to which the pixel belongs. FIG. 8 depicts a block 420. Block 420 includes subblock 422. The circles in subblock 422 represent pixels and/or samples. Subblock MV VSB 424 and pixel MV V(i,j) 426 for pixel 428 located at i,j are depicted. MV VSB 424 points to block 430, while MV V(i,j) 426 points to a pixel in block 432 that is different from the location of an equivalent pixel in block 430. To achieve a finer granularity of motion compensation, the contribution JVET-O0070 proposes techniques to refine the subblock based affine motion compensated prediction with PROF. For example, after video encoder 200 or video decoder 300 perform the subblock based affine motion compensation, video encoder 200 or video decoder 300 may refine the luma prediction sample by adding a difference derived by an optical flow equation. The refinement process is described with the following four steps, which video encoder 200 (e.g., motion estimation unit 222 and/or motion compensation unit 224) or video decoder 300 (e.g., motion compensation unit 316) may perform.

Step 1) The subblock-based affine motion compensation is performed to generate subblock prediction I(i,j).

Step 2) The spatial gradients $g_x(i,j)$ and $g_y(i,j)$ of the subblock prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The subblock prediction is extended by one pixel on each side for the gradient calculation. To reduce the memory bandwidth and complexity, the pixels on the extended borders are copied from the nearest integer pixel position in the reference picture. Therefore, additional interpolation for a padding region is avoided.

Step 3) The luma prediction refinement is calculated by the optical flow equation.

$$\Delta I(i,j)=g_x(i,j)*\Delta v_x(i,j)+g_y(i,j)*\Delta v_y(i,j)$$

where the $\Delta v(i,j)$ is the difference between pixel MV computed for sample location (i,j), denoted by v(i,j), and the subblock MV of the subblock to which pixel (i,j) belongs, as shown in FIG. 8. $\Delta v(i, j)$ 434 in FIG. 8 is represented by the dashed arrow.

Since the affine model parameters and the pixel location relative to the subblock center are not changed from subblock to subblock, $\Delta v(i,j)$ can be calculated for the first subblock, and reused for other subblocks in the same CU. Let x and y be the horizontal and vertical offset from the pixel location to the center of the subblock, $\Delta v(x,y)$ can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \frac{v_{1x} - v_{0x}}{w} \\ e = -d = \frac{v_{1y} - v_{0y}}{w} \end{cases}$$

For 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the subblock prediction I(i,j). The final prediction I' is generated as the following equation.

$I'(i,j)=I(i,j)+\Delta I(i,j)$

In VVC, even when PROF is enabled at a sequence parameter (SPS) level, the PROF refinement may not be applied at the subblock level (which may or may not be applied separately for each prediction direction, e.g., L0 and L1), for example, if the motion vectors of the control points are far from each other in terms of samples. For example, if the affine motion parameters are greater than a predetermined limit, subblock based affine motion compensation may be changed to CU based affine motion compensation to avoid large memory access bandwidth requirements which may complicate the design of a video coder.

One aim of PROF for affine motion compensated coding is to achieve pixel level granularity for affine motion compensation, without actually performing pixel level motion compensation. The motion refinement derived from the affine model (4 parameter or 6 parameter) helps to achieve that aim. However, due to this refinement, the motion difference across a subblock boundary is also virtually removed. In VVC Draft 6, deblocking filtering may be applied to internal subblock boundaries without considering the PROF refinement.

To address the issue of applying deblocking filter operations to internal subblock boundaries without considering the PROF motion refinement, video encoder 200 or video decoder 300 may selectively disable deblocking filter operations and/or modify boundary strength calculations for subblock boundaries of affine coded coding blocks. In some examples, video encoder 200 or video decoder 300 may disable the deblocking filter operations based on whether PROF is applied or not applied. It should be noted that this PROF refinement process is implicit (e.g., determined without explicit coding of syntax elements), so that video decoder 300 may perform the PROF refinement without any signaling at the block or coding unit level by video encoder 200. As a result, the PROF refinement information is not included in the signaled MV.

Example A. In one example, video encoder 200 or video decoder 300 may disable the deblocking filter (e.g., deblocking filter 217 or deblocking filter 313) for subblock boundaries of an affine coded block, when PROF is enabled at the sequence parameter set (SPS), e.g., PROF is enabled for that particular video sequence. For example, video encoder 200 or video decoder may determine whether a coding mode for a current block of the video data is an affine mode. Video encoder 200 or video decoder 300 may determine whether PROF is enabled in the SPS for the current block. Video encoder 200 may signal whether PROF is enabled in the SPS and video decoder 300 may parse a syntax element indicative of whether PROF is enabled. Based at least in part on the coding mode for the current block being the affine mode and PROF being enabled for the current block, video encoder 200 or video decoder 300 may disable deblocking filter 217 or deblocking filter 313, respectively, for subblock boundaries of the current block. Video encoder 200 or video decoder 300 may code current block with the deblocking filter disabled for the subblock boundaries of the current block.

Example B. In another example, video encoder 200 or video decoder 300 may disable the deblocking filter (e.g., deblocking filter 217 or deblocking filter 313) for subblock boundaries for an affine coded block, when PROF is enabled at the SPS level, and the coding block is bi-predicted. In this example, for uni-predicted blocks, subblock boundaries are still deblock filtered. For example, video encoder 200 or video decoder may determine whether a coding mode for a current block of the video data is an affine mode. Video encoder 200 or video decoder 300 may determine whether PROF is enabled in the SPS for the current block. Video encoder 200 may signal whether PROF is enabled in the SPS and video decoder 300 may parse a syntax element indicative of whether PROF is enabled. Video encoder 200 or video decoder 300 may determine whether the current block is bi-predicted. Based at least in part on the coding mode for the current block being the affine mode, PROF being enabled for the current block, and the current block being bi-predicted, video encoder 200 or video decoder 300 may disable deblocking filter 217 or deblocking filter 313, respectively, for subblock boundaries of the current block. Video encoder 200 or video decoder 300 may code current block with the deblocking filter disabled for the subblock boundaries of the current block.

Example C. In a third example, video encoder 200 or video decoder 300 may disable the deblocking filter (e.g., deblocking filter 217 or deblocking filter 313) for subblock boundaries, when at the block level either of the following two cases are encountered: Case 1: the coding block is uni-predicted, and PROF is enabled for that particular prediction direction (L0 OR L1). Case 2: the coding block is bi-predicted, and PROF is enabled for both the bi-prediction directions (e.g., L0 and L1).

In the example of case 1, video encoder 200 or video decoder may determine whether a coding mode for a current block of the video data is an affine mode. Video encoder 200 or video decoder 300 may determine whether the current block is un-predicted. Video encoder 200 or video decoder 300 may determine whether PROF is enabled for a direction of the uni-prediction for the current block. Video encoder 200 may signal whether PROF is enabled for the direction of the uni-prediction for the current block and video decoder 300 may parse a syntax element indicative of whether PROF is enabled for the direction of the uni-prediction for the current block. Based at least in part on the coding mode for the current block being the affine mode, the current block being uni-predicted, and PROF being enabled in the direction of the uni-prediction for the current block, video encoder 200 or video decoder 300 may disable deblocking filter 217 or deblocking filter 313, respectively, for subblock boundaries of the current block. Video encoder 200 or video decoder 300 may code current block with the deblocking filter disabled for the subblock boundaries of the current block.

In the example of case 2, video encoder 200 or video decoder may determine whether a coding mode for a current block of the video data is an affine mode. Video encoder 200 or video decoder 300 may determine whether the current block is bi-predicted. Video encoder 200 or video decoder 300 may determine whether PROF is enabled for both bi-prediction directions for the current block. Video encoder 200 may signal whether PROF is enabled for both bi-prediction directions for the current block and video decoder 300 may parse a syntax element(s) indicative of whether PROF is enabled for both bi-prediction directions for the current block. Based at least in part on the coding mode for the current block being the affine mode, the current block being bi-predicted, and PROF being enabled for both bi-prediction directions, video encoder 200 or video decoder 300 may disable deblocking filter 217 or deblocking filter 313, respectively, for subblock boundaries of the current block. Video encoder 200 or video decoder 300 may code current block with the deblocking filter disabled for the subblock boundaries of the current block.

Example D. In another example, in addition to example C, for the cases where the coding block is bi-predicted and PROF is enabled only in one direction (L0 or L1) and disabled in the other direction, video encoder 200 or video decoder 300 may perform a boundary strength calculation with only the MV information of the prediction direction where PROF is disabled.

For example, MVp0 and MVp1, from prediction direction L0 and L1 (the reference pictures for L0 and L1 directions are not the same), are the two MVs on P side, and MVq0 and MVq1 are the two MVs on Q side, then in VTM6, currently, video encoder 200 or video decoder 300 may calculate the boundary strength (bS) using:
if (|MVp0,x−MVq0,x|=>Threshold) OR if (|MVp0,y−MVq0,y|=>Threshold) OR (|MVp1,x−MVq1,x|=>Threshold) OR if (|MVp1,y−MVq1,y|=>Threshold) bS is set to 1, otherwise bS=0. See B. Bross, J. Chen, S. Liu, "Versatile Video Coding (Draft 6)", 15th JVET Meeting, Gothenburg, S E, July 2019, JVET-O2001. In VTM6, this threshold is set to ½ pixel.

Now, without loss of generality, if PROF is disabled in L0 direction, and enabled in L1 direction, then video encoder 200 or video decoder 300 may calculate bS using, if (|MVp0,x−MVq0,x|=>Threshold) OR if (|MVp0,y−MVq0,y|=>Threshold)) bS is set to 1, otherwise bS=0. (Threshold is unchanged, i.e., ½ pixel).
This is because, as PROF is enabled in L1 direction, MVs for the L1 direction are assumed to be continuous across subblock boundaries, and hence need not be taken into account when calculating bS.

For example, video encoder 200 or video decoder 300 may determine whether a second current block is bi-predicted. Video encoder 200 or video decoder 300 may determine whether PROF is enabled for only one bi-prediction direction (e.g., L0 or L1, but not both) for the second current block. Video encoder 200 may signal whether PROF is enabled for only one bi-prediction direction for the second current block and video decoder 300 may parse a syntax element indicative of whether PROF is enabled for only one bi-prediction direction for the second current block. Based on the second current block being bi-predicted and PROF being enabled for only one bi-prediction direction for the second current block, video encoder 200 or video decoder 300 may determine a boundary strength using motion vector information of a bi-prediction direction for which PROF is disabled. Video encoder 200 or video decoder 300 may deblock the second current block based on the determined boundary strength. In some examples, the determining the boundary strength may include determining if a sum of motion vector differences is greater or equal to a threshold.

Example E. In another example, if PROF is applied on the SPS level, video encoder 200 and video decoder 300 may modify the threshold for the MV difference (as described in the example D above)). A scaling factor K may be applied for the threshold such that, if (d>=K*Threshold) bS=1, otherwise bS=0, where K is greater than 1 (for example, it could be 1.5, or 2 or 3 etc.). A scaling factor K may be applied because the actual MV difference may be less than the computation of d, as computation of d uses the information of an unrefined MV. Hence, after the refinement is applied the actual MV difference would be less. In some examples, example E can be seen as a simplified alternate solution of the examples C and D, where the block level enable/disable of PROF checking is avoided. For example, video encoder 200 or video decoder 300 may determine the boundary strength by determining if a sum of motion vector differences is greater or equal to a threshold multiplied by a scaling factor.

Example F. In another example, if PROF is applied on the SPS level, then video encoder 200 or video decoder 300 may disable the deblocking filter (e.g., deblocking filter 217 of video encoder 200 or deblocking filter 317 of video decoder 300) if the MV differences of the corner points (e.g., control points 384 and 386 in a 4 parameter affine block such as block 400 of FIG. 5 or control points 392, 394 and/or 396 in a 6 parameter affine block such as block 402 of FIG. 5) are less than a predetermined threshold. This predetermined threshold may be dependent on the block size of the block, the quantization parameter (QP), the temporal id, prediction type (uni- or bi-prediction) and/or prediction direction (L0 or L1).

For example, video encoder 200 or video decoder 300 may determine whether the coding mode for a current block of the video data is an affine mode. Video encoder 200 or video decoder 300 may determine whether PROF is enabled in the SPS for the current block. Video encoder 200 may signal whether PROF is enabled in the SPS and video decoder 300 may parse a syntax element indicative of whether PROF is enabled. Video encoder 200 or video decoder 300 may determine whether motion vector differences of control points of the current block are less than a predetermined threshold Based at least in part on the coding mode for the current block being the affine mode, PROF being enabled in the SPS for the current block, and motion vector difference of the control points of the current block being less than the predetermined threshold, directions, video encoder 200 or video decoder 300 may disable deblocking filter 217 or deblocking filter 313, respectively, for subblock boundaries of the current block. Video encoder 200 or video decoder 300 may code current block with the deblocking filter disabled for the subblock boundaries of the current block. In some examples, the predetermined threshold is based on one or more of block size, QP, temporal id, prediction type or prediction direction.

Example G. In another example, if PROF is applied on the SPS level, then video encoder 200 or video decoder 300 may disable the deblocking filter (e.g., deblocking filter 217 of video encoder 200 or deblocking filter 313 of video decoder 300) if the MV differences of the first and last subblock (in horizontal and/or in the vertical direction) of the block is less than a predetermined threshold. For example, referring back to FIG. 6, subblock 406 may represent the first subblock in a horizontal direction and subblock 407 may represent the last subblock in the horizontal direction. Similarly, subblock 406 may represent the first subblock in the vertical direction and subblock 408 may represent the last subblock in the vertical direction. The predetermined threshold may be dependent on the block size, QP, the temporal id, prediction type (uni- or bi-prediction) and/or prediction direction (L0 or L1).

For example, video encoder 200 or video decoder 300 may determine whether a coding mode for a current block of the video data is an affine mode. Video encoder 200 or video decoder 300 may determine whether PROF is enabled in the SPS for the current block. Video encoder 200 may signal whether PROF is enabled in the SPS and video decoder 300 may parse a syntax element indicative of whether PROF is enabled. Video encoder 200 or video decoder 300 may determine whether motion vector differences of a first and last subblock in a direction are less than a predetermined threshold. Based at least in part on the coding mode for the current block being the affine mode, PROF being enabled in the SPS for the current block, and motion vector difference of the first and last subblock in the direction being less than the predetermined threshold, video encoder 200 or video decoder 300 may disable deblocking filter 217 or deblocking filter 313, respectively, for subblock boundaries of the current block. Video encoder 200 or video decoder 300 may code current block with the deblocking filter disabled for the subblock boundaries of the current block. In some examples, the predetermined threshold is based on one or more of block size, QP, temporal id, prediction type or prediction direction.

Example H. It is also possible to selectively disable the deblocking filter (e.g., deblocking filter 217 or deblocking filter 313) for affine subblock boundaries by signaling it at the SPS, PPS, Slice or even at the coding tree unit (CTU) level. For example, video encoder 200 may selectively disable deblocking filter 217 and signal a syntax element to video decoder 300 to disable deblocking filter 313. The syntax element may be in the SPS, the PPS, a slice header or a CTU header.

Figure 9:
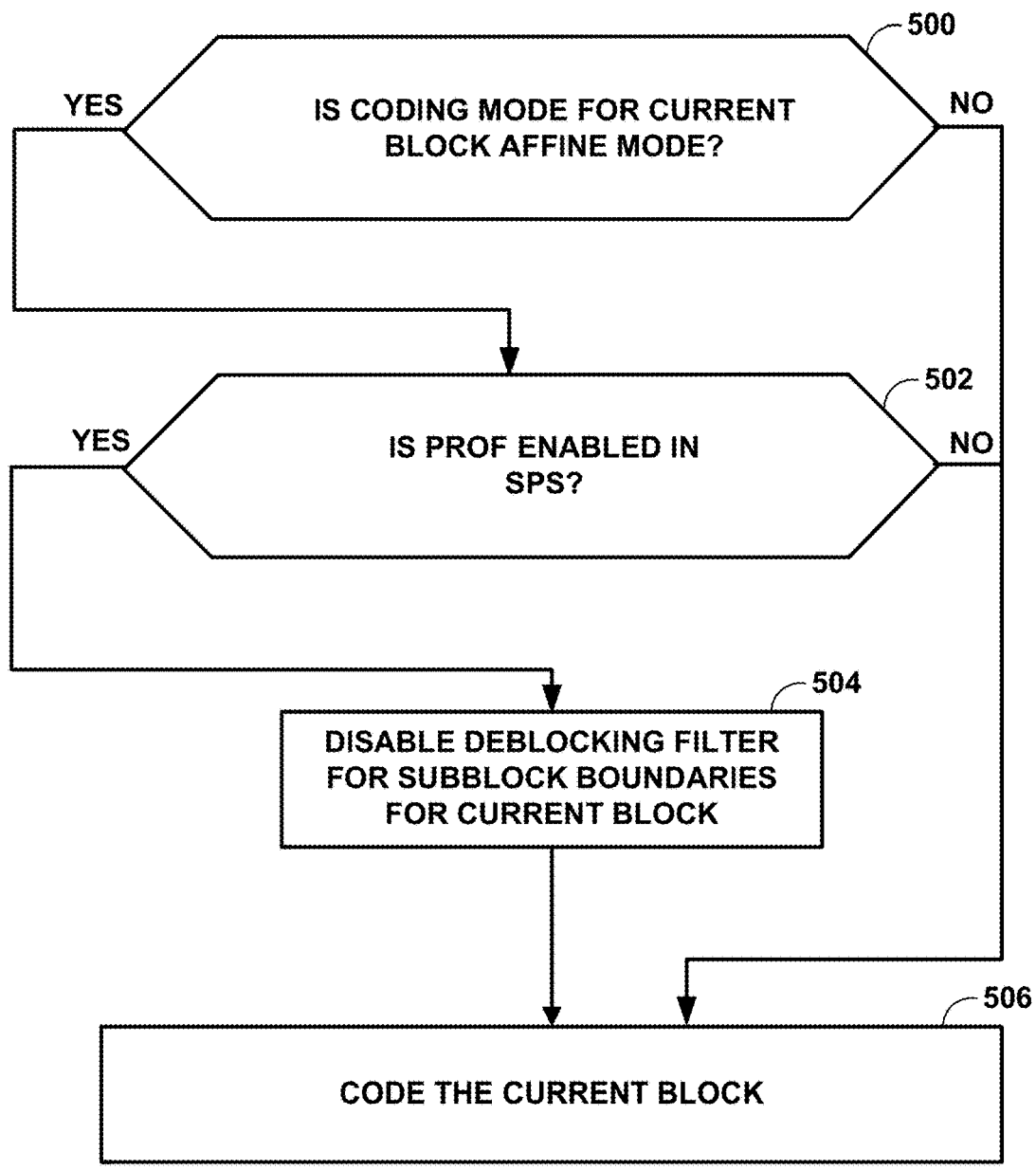
FIG. 9 is a flowchart illustrating an example of selectively disabling deblocking filter operations according to the techniques of this disclosure.

FIG. 9 is a flowchart illustrating an example of selectively disabling deblocking filter operations according to the techniques of this disclosure. Video encoder 200 or video decoder 300 may determine whether a coding mode for a current block of the video data is an affine mode (500). For example, the current block may have irregular motion and video encoder 200 may determine that the current block would best be coded with affine mode. Video encoder 200 may signal a syntax element to video decoder 300 indicating that the current block is encoded using affine mode. Video decoder 300 may determine the coding mode for the current block is affine mode by parsing the syntax element.

If the coding mode for the current block is affine mode (the "YES" path from block 500), video encoder 200 or video decoder 300 may determine whether PROF is enabled in the SPS for the current block (502). For example, video encoder may enable PROF for a sequence of video pictures including the current block and may signal a syntax element in the SPS indicative of PROF being enabled for the sequence of video pictures including the current block in a bitstream to video decoder 300. Video decoder 300 may parse the syntax element to determine whether PROF is enabled in the SPS for the current block.

If PROF is enabled for the current block and the coding mode for the current block is affine mode (the "YES" path from block 502), video encoder 200 or video decoder 300 may disable a deblocking filter for subblock boundaries of the current block (504). For example, video encoder 200 or video decoder 300 may disable deblocking filter 217 or deblocking filter 313, respectfully, for subblock boundaries of the current block of video data. Video encoder 200 or video decoder 300 may code the current block with the deblocking filter disabled for the subblock boundaries of the current block (506). For example, video encoder 200 may encode the current block with the deblocking filter disabled for the subblock boundaries of the current block. Video decoder 300 may decode the current block with the deblocking filter disabled for the subblock boundaries of the current block.

If video encoder 200 or video decoder 300 determine the coding mode for the current bock is not affine mode (the "NO" path from block 500), video encoder 200 or video decoder 300 may code the current block without disabling deblocking filter 217 or deblocking filter 313, respectfully, for subblock boundaries (506). Similarly, if video encoder 200 or video decoder 300 determine that PROF is not enabled in the SPS for the current block (the "NO" path from block 502), video encoder 200 or video decoder 300 may code the current block without disabling deblocking filter 217 or deblocking filter 313, respectfully, for subblock boundaries of the current block (506).

In some examples, video encoder 200 or video decoder 300 may base the disabling of the deblocking filter on additional conditions other than just the coding mode of the current block being the affine mode and PROF being enabled in the SPS. For example, the disabling of the deblocking filter may be further based on the current block being bi-predicted. In another example, the disabling of the deblocking filter may be further based on the current block being uni-predicted and PROF being enabled for the direction of the uni-prediction for the current block. In another example, the disabling of the deblocking filter may be further based on the current block being bi-predicted and PROF being enabled for both bi-prediction directions for the current block. In another example, the disabling of the deblocking filter may be further based on motion vector differences of the control points being less than a predetermined threshold. In another example, the disabling the deblocking filter may be further based on the motion vector differences of the first and last subblock in the direction being less than the predetermined threshold.

In some examples, video encoder 200 or video decoder 300 may determine whether a second current block is bi-predicted and determine whether PROF is enabled for only one bi-prediction direction for the second current block. Based on the second current block being bi-predicted and PROF being enabled for only one bi-prediction direction for the second current block, video encoder 200 or video decoder 300 may determine a boundary strength using motion vector information of a bi-prediction direction for which PROF is disabled. Video encoder 200 or video decoder 300 may code the second current block based on the determined boundary strength.

Figure 10:
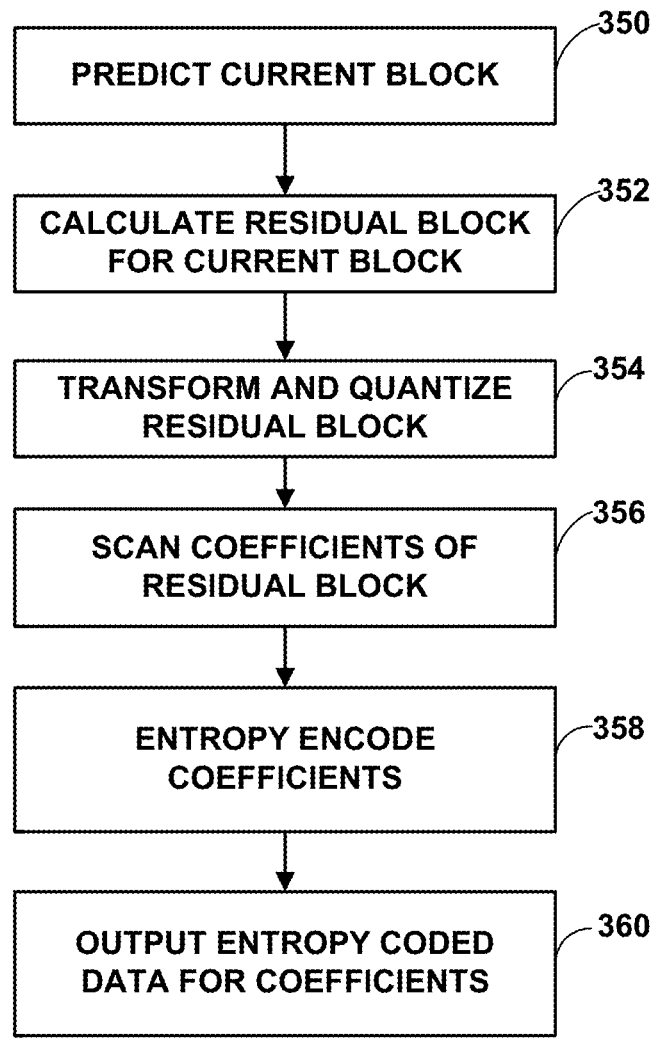
FIG. 10 is a flowchart illustrating a method of encoding video data according to techniques of this disclosure.

FIG. 10 is a flowchart illustrating an example method for encoding a current block. The current block may comprise a current CU. Although described with respect to video encoder 200 (FIGS. 1 and 3), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 11:
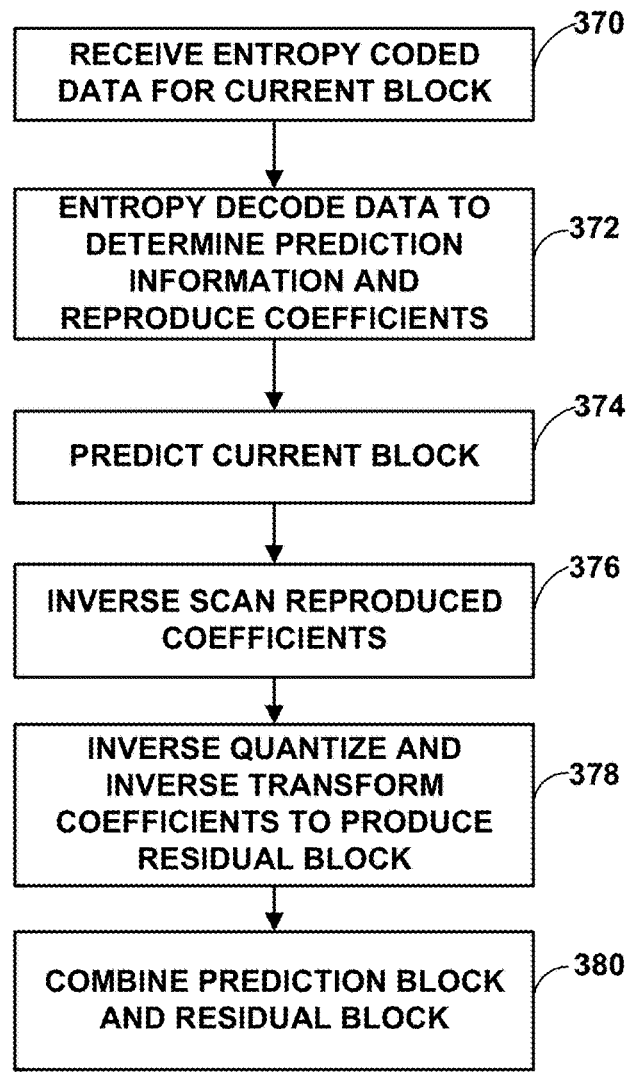
FIG. 11 is a flowchart illustrating a method of decoding video data according to techniques of this disclosure.

FIG. 11 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 11.

Video decoder 300 may receive entropy encoded data for the current block, such as entropy encoded prediction information and entropy encoded data for coefficients of a residual block corresponding to the current block (370).

Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

By selectively disabling deblocking filtering for subblock boundaries of an affine coded block, a video coder may avoid over smoothing that may occur when the video coder applies both PROF and deblocking filter operations. Moreover, according to the techniques of this disclosure, the video coder may also save processing resources because deblocking filter operations otherwise use processing resources.

This disclosure includes the following examples.

Example 1. A method of coding video data, the method comprising: selectively disabling a deblocking filter for subblock boundaries of an affine coded block; and coding video data based upon the selective disabling.

Example 2. The method of example 1, wherein the selective disabling comprises: determining whether pattern refined optical flow (PROF) is enabled in the sequence parameter set (SPS) for a particular video sequence for video data being coded; and if PROF is enabled in the SPS for the particular video sequence for video data being coded, disabling the deblocking filter for subblock boundaries for the affine coded block.

Example 3. The method of example 1, wherein the selective disabling comprises: determining whether PROF is enabled in the SPS and whether the affine coded block is bi-predicted; and if PROF is enabled in the SPS and the affine coded block is bi-predicted, disabling the deblocking filter for subblock boundaries for the affine coded block.

Example 4. The method of example 1, wherein the selective disabling comprises: determining whether the affine coded block is uni-predicted and whether PROF is enabled for a direction of the uni-prediction; and if the affine coded block is un-predicted and Prof is enabled for the direction of the uni-prediction, disabling the deblocking filter for subblock boundaries for the affine coded block.

Example 5. The method of example 1, wherein the selective disabling comprises: determining whether the affine coded block is bi-predicted and whether PROF is enabled for both directions; and if the affine coded block is bi-predicted and PROF is enabled for both directions, disabling the deblocking filter for subblock boundaries for the affine coded block.

Example 6. The method of example 1, wherein the selective disabling comprises: determining whether PROF is applied at an SPS level and whether motion vector differences of corner points is less than a predetermined threshold; and if PROF is applied at an SPS level and the motion vector differences of corner points is less than the predetermined threshold, disabling the deblocking filter for subblock boundaries for the affine coded block.

Example 7. The method of example 6, wherein the predetermined threshold is based on one or more of block size, QP, temporal id, prediction type or prediction direction.

Example 8. The method of example 1, wherein the selective disabling comprises: determining whether PROF is applied at an SPS level and whether motion vector differences of a first and last subblock in a direction is less than a predetermined threshold; and if PROF is applied at an SPS level and the motion vector differences of the first and last subblock in the direction is less than the predetermined threshold, disabling the deblocking filter for subblock boundaries for the affine coded block.

Example 9. The method of example 8, wherein the direction is horizontal or vertical and the predetermined threshold is based on one or more of block size, QP, temporal id, prediction type or prediction direction.

Example 10. The method of example 1, further comprising signaling disabling of the deblocking filter for subblock boundaries of an affine coded block in a bitstream.

Example 11. The method of example 10, wherein the signaling the disabling of the deblocking filter is at one of an SPS, picture parameter set, slice or coding tree unit level.

Example 12. A method of coding video data, the method comprising: determining whether an affine coded block is bi-predicted and whether PROF is enabled in one direction and disabled in another direction; and if the affine coded block is bi-predicted and whether PROF is enabled in one direction and disabled in another direction, calculating a boundary strength based upon motion vector information of a prediction direction for which PROF is disabled; and coding the video data based upon the boundary strength.

Example 13. A method of coding video data, the method comprising: determining whether a coding mode for a current block of the video data is an affine mode; determining whether the current block is bi-predicted; determining whether PROF is enabled in one direction and disabled in another direction; and based on the coding mode for the current block being the affine mode, the current block being bi-predicted, and PROF being enabled in one direction and disabled in another direction, calculating a boundary strength based upon motion vector information of a prediction direction for which PROF is disabled; and coding the video data based upon the boundary strength.

Example 14. The method of example 12 or 13, wherein the calculating a boundary strength comprises determining if a sum of motion vector differences is greater or equal to a threshold.

Example 15. The method of example 12 or 13, wherein the calculating a boundary strength comprises determining if a sum of motion vector differences is greater or equal to a threshold multiplied by a scaling factor.

Example 16. The method of any of examples 1-15, wherein coding comprises decoding.

Example 17. The method of any of examples 1-15, wherein coding comprises encoding.

Example 18. A device for coding video data, the device comprising one or more means for performing the method of any of examples 1-15.

Example 19. The device of example 18, wherein the one or more means comprise one or more processors implemented in circuitry.

Example 20. The device of any of examples 18 and 19, further comprising a memory to store the video data.

Example 21. The device of any of examples 18-20, further comprising a display configured to display decoded video data.

Example 22. The device of any of examples 18-21, wherein the device comprises one or more of a camera, a computer, a mobile device, a broadcast receiver device, or a set-top box.

Example 23. The device of any of examples 18-22, wherein the device comprises a video decoder.

Example 24. The device of any of examples 18-23, wherein the device comprises a video encoder.

Example 25. A computer-readable storage medium having stored thereon instructions that, when executed, cause one or more processors to perform the method of any of examples 1-15.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding video data, the device comprising:
   memory configured to store the video data; and
   one or more processors implemented in circuitry and communicatively coupled to the memory, the one or more processors being configured to:
      determine whether a coding mode for a first block of the video data is an affine mode;
      determine whether pattern refined optical flow (PROF) is enabled in a sequence parameter set (SPS) for the first block;
      determine whether the first block is bi-predicted;
      based at least in part on the coding mode for the first block being the affine mode, the first block being bi-predicted, and PROF being enabled in the SPS for the first block, disable a deblocking filter for subblock boundaries of the first block; and
   decode the first block with the deblocking filter disabled for the subblock boundaries of the first block.

2. The device of claim 1, wherein the one or more processors are further configured to:
   determine whether a coding mode for a second block of the video data is the affine mode;
   determine whether the second block is uni-predicted;
   determine whether PROF is enabled for a direction of uni-prediction for the second block;
      based at least in part on the coding mode for the second block being the affine mode, the second block being uni-predicted, and PROF being enabled for the direction of uni-prediction, disable a deblocking filter for subblock boundaries of the second block; and
      decode the second block with the deblocking filter disabled for the subblock boundaries of the second block.

3. The device of claim 1, wherein the one or more processors are further configured to:
   determine whether PROF is enabled for both bi-prediction directions for the first block,
   wherein the one or more processors disable the deblocking filter further based on the first block being bi-predicted and PROF being enabled for both bi-prediction directions for the first block.

4. The device of claim 3, wherein the one or more processors are further configured to:
- determine whether a second block is bi-predicted; and
- determine whether PROF is enabled for only one bi-prediction direction for the second block;
- based on the second block being bi-predicted and PROF being enabled for only one bi-prediction direction for the second block, determine a boundary strength using the motion vector information of a bi-prediction direction for which PROF is disabled; and
- deblock the second block based on the determined boundary strength.

5. The device of claim 4, wherein the one or more processors determine the boundary strength by determining if a sum of motion vector differences is greater or equal to a threshold.

6. The device of claim 4, wherein the one or more processors determine the boundary strength by determining if a sum of motion vector differences is greater or equal to a threshold multiplied by a scaling factor.

7. The device of claim 1, wherein the one or more processors are further configured to:
- determine whether motion vector differences of control points of the first block are less than a predetermined threshold,
- wherein the one or more processors disable the deblocking filter further based on the motion vector differences of the control points being less than the predetermined threshold.

8. The device of claim 7, wherein the predetermined threshold is based on one or more of block size, quantization parameter (QP), temporal id, prediction type or prediction direction.

9. The device of claim 1, wherein the one or more processors are further configured to:
- determine whether motion vector differences of a first and last subblock of the first block in a direction are less than a predetermined threshold,
- wherein the one or more processors disable the deblocking filter further based on the motion vector differences of the first and last subblock of the first block in the direction being less than the predetermined threshold.

10. The device of claim 9, wherein the direction is horizontal or vertical and the predetermined threshold is based on one or more of block size, QP, temporal id, prediction type or prediction direction.

11. A method of decoding video data, the method comprising:
- determining whether a coding mode for a first block of the video data is an affine mode;
- determining whether pattern refined optical flow (PROF) is enabled in a sequence parameter set (SPS) for the first block;
- determining whether the first block is bi-predicted;
- based at least in part on the coding mode for the first block being the affine mode, the first block being bi-predicted, and PROF being enabled in the SPS for the first block, disabling a deblocking filter for subblock boundaries of the first block; and
- decoding the first block with the deblocking filter disabled for the subblock boundaries of the first block.

12. The method of claim 11, further comprising:
- determining whether a coding mode for a second block of the video data is the affine mode:
- determining whether the second block is uni-predicted;
- determining whether PROF is enabled for a direction of uni-prediction for the second block;
- based at least in part on the coding mode for the second block being the affine mode, the second block being uni-predicted, and PROF being enabled in for the direction of uni-prediction, disabling a deblocking filter for subblock boundaries of the second block; and
- decoding the second block with the deblocking filter disabled for the subblock boundaries of the second block.

13. The method of claim 11, further comprising:
- determining whether PROF is enabled for both bi-prediction directions for the first block,
- wherein disabling the deblocking filter is further based on the first block being bi-predicted and PROF being enabled for both bi-prediction directions for the first block.

14. The method of claim 13, further comprising:
- determining whether a second block is bi-predicted;
- determining whether PROF is enabled for only one bi-prediction direction for the second block;
- based on the second block being bi-predicted and PROF being enabled for only one bi-prediction direction for the second block, determining a boundary strength using motion vector information of a bi-prediction direction for which PROF is disabled; and
- deblocking the second block based on the determined boundary strength.

15. The method of claim 14, wherein determining the boundary strength comprises determining if a sum of motion vector differences is greater or equal to a threshold.

16. The method of claim 14, wherein determining the boundary strength comprises determining if a sum of motion vector differences is greater or equal to a threshold multiplied by a scaling factor.

17. The method of claim 11, further comprising:
- determining whether motion vector differences of control points of the first block are less than a predetermined threshold,
- wherein disabling the deblocking filter is further based the motion vector differences of the control points being less than the predetermined threshold.

18. The method of claim 17, wherein the predetermined threshold is based on one or more of block size, quantization parameter (QP), temporal id, prediction type or prediction direction.

19. The method of claim 11, further comprising:
- determining whether motion vector differences of a first and last subblock of the first block in a direction are less than a predetermined threshold,
- wherein disabling the deblocking filter is further based on the motion vector differences of the first and last subblock of the first block in the direction being less than the predetermined threshold.

20. The method of claim 19, wherein the direction is horizontal or vertical and the predetermined threshold is based on one or more of block size, QP, temporal id, prediction type or prediction direction.

21. A device for encoding video data, the device comprising:
- memory configured to store the video data; and
- one or more processors implemented in circuitry and communicatively coupled to the memory, the one or more processors being configured to:
  - determine whether a coding mode for a first block of the video data is an affine mode;
  - signal that pattern refined optical flow (PROF) is enabled in a sequence parameter set (SPS) for the first block;

determine whether the first block is bi-predicted;

based at least in part on the coding mode for the first block being the affine mode, the first block being bi-predicted, and PROF being enabled for the first block, disable a deblocking filter for subblock boundaries of the first block; and encode the first block with the deblocking filter disabled for the subblock boundaries of the first block.

22. The device of claim 21, wherein the one or more processors are further configured to:

determine whether a coding mode for a second block of the video data is the affine mode;

determine whether the second block is uni-predicted;

signal that PROF is enabled for a direction of uni-prediction for the second block;

based at least in part on the coding mode for the second block being the affine mode, the second block being uni-predicted, and PROF being enabled in for the direction of uni-prediction, disable a deblocking filter for subblock boundaries of the second block; and encode the second block with the deblocking filter disabled for the subblock boundaries of the second block.

23. A non-transitory computer-readable storage medium storing instructions that, when executed, cause one or more processors to:

determine whether a coding mode for a first block of video data is an affine mode;

determine whether pattern refined optical flow (PROF) is enabled in a sequence parameter set (SPS) for the first block;

determine whether the first block is bi-predicted;

based at least in part on the coding mode for the first block being the affine mode, the first block being bi-predicted, and PROF being enabled in the SPS for the first block, disable a deblocking filter for subblock boundaries of the first block; and decode first block with the deblocking filter disabled for the subblock boundaries of the first block.

* * * * *